G. W. WILKIN.
DIFFERENTIAL.
APPLICATION FILED JUNE 25, 1919.

1,344,107.

Patented June 22, 1920.

WITNESS

INVENTOR
G. W. WILKIN
BY
ATTORNEYS

UNITED STATES PATENT OFFICE.

GEORGE W. WILKIN, OF GRANGEVILLE, IDAHO.

DIFFERENTIAL.

1,344,107.      Specification of Letters Patent.      Patented June 22, 1920.

Application filed June 25, 1919. Serial No. 306,595.

*To all whom it may concern:*

Be it known that I, GEORGE W. WILKIN, a citizen of the United States, and a resident of Grangeville, in the county of Idaho and State of Idaho, have made certain new and useful Improvements in Differentials, of which the following is a specification.

This invention relates to an improved differential gearing, and more particularly to a differential gearing for motor vehicle propulsion of that type wherein a direct driving power is transmitted to all four wheels of the vehicle.

It is the primary object of the present invention to provide a very simple differential gearing of the above character which will permit of the turning or rotation of all four wheels of the vehicle independently of each other, and which will also under normal conditions transmit a maximum of driving power to each of the vehicle wheels.

It is another important object of the invention to provide simple and effective means for yieldingly holding the differentially driven gears against casual rotation to insure their operation in unison in the positive application of the driving power thereto.

The invention also has for a further general object to improve and simplify the differential gearing of the four wheel drive type of motor vehicle so that the same will be positive and reliable in its operation, not liable to get out of order and also capable of manufacture at comparatively small cost.

With the above and other objects in view, the invention consists in the improved combination, construction and relative arrangement of the several parts as will be hereinafter more fully described, subsequently claimed and illustrated in the accompanying drawing in which similar reference characters designate corresponding parts throughout the several views, and wherein:—

Figure 1:
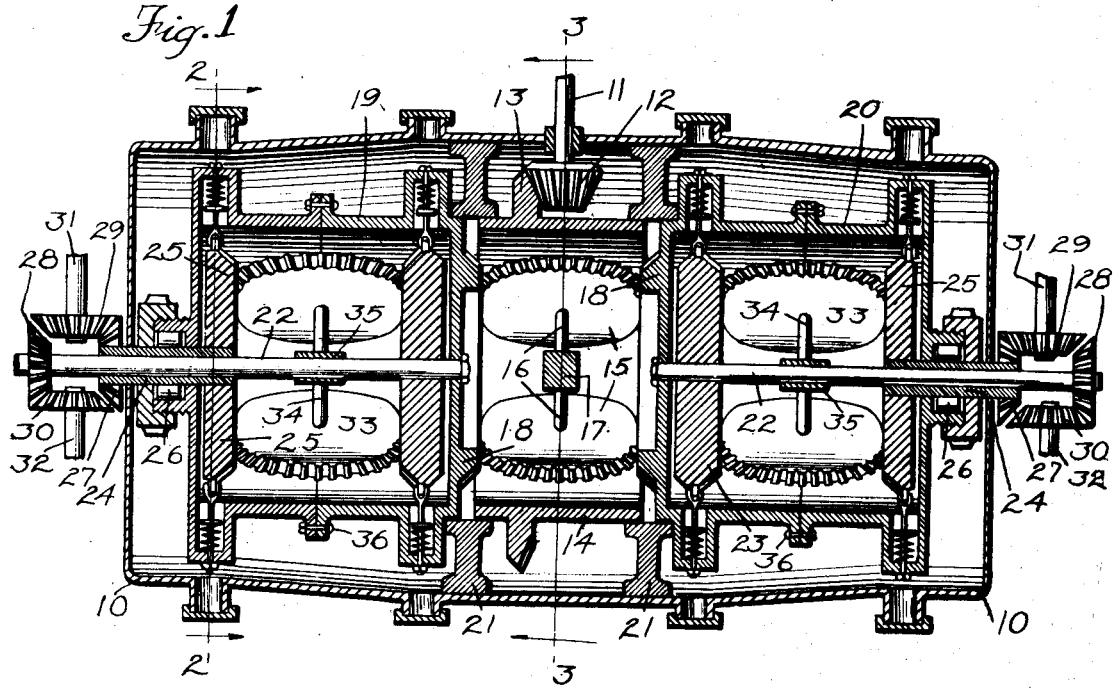
Figure 1 is a longitudinal sectional view through the differential gear housing and case illustrating the preferred embodiment of my invention.

Referring now to these figures, and particularly to Fig. 1, my invention proposes a differential for a four wheel drive, in which the gearing generally is inclosed within a differential casing 10 to which the drive shaft 11 leads as usual, extending through one side and having upon its inner end within the case a bevel gear 12. This bevel gear engages the ring gear 13 of the differential housing 14, the latter of which supports an internal annular series of differential gears 15, rotatable upon shafts 16 radiating from a central hub 17.

The differential gears 15 engage the inner side ring gears 18 of a pair of side housings 19 and 20, whose inner portions at least are of the same diameter as the side portions of the main differential housing 14, so that the main and side housings may have simultaneous bearing within the internal annular bearing members 21 of the case 10, located as shown particularly in Fig. 1, upon relatively opposite sides of the main ring gear 13.

A shaft 22 extends axially through each of the side housings 19 and 20 and a bevel gear 23 is secured upon the inner end of the shaft adjacent to the inner wall of the respective side housing nearest its ring gear 18. The outer portion of each shaft 22 is journaled through a tubular shaft 24 upon whose inner end within the respective side housing adjacent to its outer wall is secured a bevel gear 25. Each tubular shaft 24 is preferably extended through a roller bearing 26, supported by the outer end of the respective side housing, and each tubular shaft projects beyond and axially through the adjacent end of the differential case 10, and carries an external bevel gear 27 opposing in spaced relation a bevel gear 28 secured upon the outer extremity of the shaft 22, which extends beyond the outer end of its tubular shaft 24. These gears 27 and 28 are respectively in engagement with bevel gears 29 and 30 located upon counter-shafts 31 and 32, respectively, extending for instance to the front and rear wheels at one side, so that each side housing 19, 20, obviously takes care of the two wheels at one side, and either provides for the simultaneous application of power thereto independently of the other side by virtue of the connection of the side housings through the main differential gears 15, or brings about a differential application of power to the front and rear wheels at the respective side through the differential connection between the solid and tubular shaft gears 23 and 25, in the form of differential gears 33 in each of the side housings, which are rotatable as a series with the side housing, similar to the movement of the main differential gears 15 with the main differential housing 14, and are rotatable upon radial shafts 34 projecting from a central hub 35 journaled upon the shaft 22 passing axially therethrough.

Figure 2:
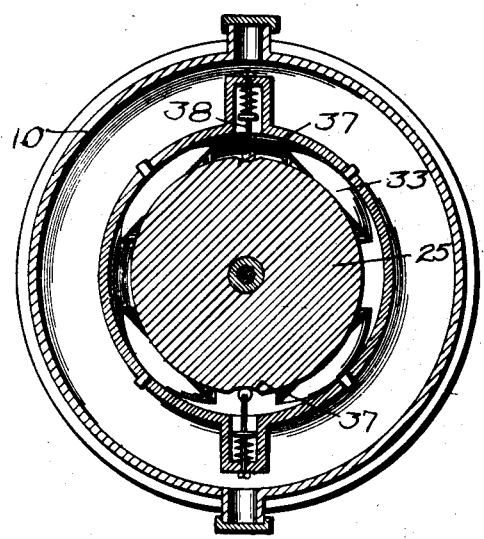
Fig. 2 is a sectional view taken on the line 2—2 of Fig. 1.
Figure 3:
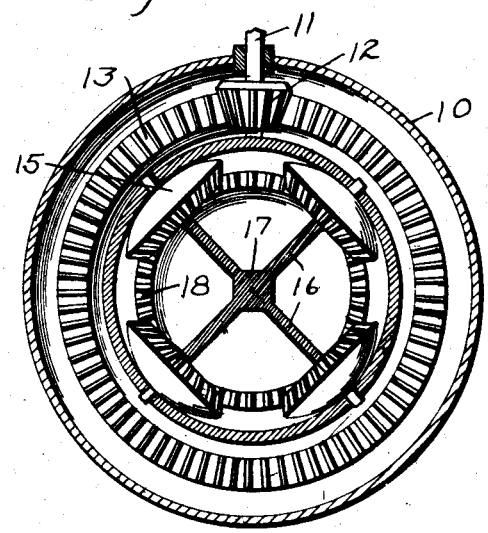
Fig. 3 is a section taken on the line 3—3 of Fig. 1.

Each of the side housings, the opposite ends of which are closed, preferably consists of two parts, having abutting flanges secured by connecting bolts, as seen at 36, so as to provide for disassembly in case it becomes necessary to renew the gears, and in order to provide a yielding check, the function of which is to confine under all ordinary circumstances the application of power to the wheels at each side in a uniform manner, the gears 23 and 25 within each of the side housings may have their peripheral edges provided with shallow notches 37 as seen in Fig. 2, for engagement by rollers at the inner ends of spring pressed control rods 38. This latter mechanism will be understood as desirable merely and not essential to the operation of the parts, as previously described.

Thus, it is obvious my invention provides a simple compact arrangement to take care of the differential action as between the wheels of a four wheel drive, as well as a mechanism which is capable of being inclosed within a comparatively sightly lubricant holding case which insures proper lubrication of the parts at all times, and a mechanism which lends itself to simple effective bearing within the differential case.

I claim:—

1. In a differential for a four wheel drive, a main differential housing, differential gears carried thereby, a pair of side housings at opposite sides of the main housing, having gears engaged by the said differential gears, pairs of shafts journaled axially through portions of the said side housings, spaced gears secured upon the said shafts within each side housing, differential gears carried by each of the side housings and engaging the said spaced gears thereof, and connections beyond each of the side housings independently geared to the shafts thereof.

2. A differential for a four wheel drive including a main differential housing, a pair of side housings differentially geared to the main housing and each provided with a set of differential gears, pairs of side gears within each of the side housings connected by the differential gears thereof, pairs of shafts projecting externally from each of the side housings on which the side gears thereof are independently secured, and connections at opposite sides of the side housings independently geared to the shafts thereof.

3. A differential for a four wheel drive including a main differential housing, a pair of side housings differentially geared to the main housing and each provided with a set of differential gears, pairs of side gears within each of the side housings connected by the differential gears thereof, pairs of shafts projecting externally from each of the side housings on which the side gears thereof are independently secured, connections at opposite sides of the side housings independently geared to the shafts thereof, said main and side differential housings having portions adjacent to one another, and of a similar diameter, a differential case through opposite ends of which the said side shafts project, and bearings within the case receiving the said adjacent portions of the main and side housings, as described.

4. A differential for a four wheel drive including a main differential housing, a pair of side housings differentially geared to the main housing and each provided with a set of differential gears, pairs of side gears within each of the side housings connected by the dfferential gears thereof, pairs of shafts projecting externally from each of the side housings on which the side gears thereof are independently secured, connections at opposite sides of the side housings independently geared to the shafts thereof, a gear case inclosing the said main and side differential housings, and bearings within the differential case lapping adjacent portions of the main and side housings at the inner sides of the latter.

5. A differential for a four wheel drive including a main differential housing having differential gears and openings at its opposite sides, a pair of side housings, the inner ends of which oppose opposite sides of the main housing and are provided with gears engaged by the differential gears of the main housing, a differential case inclosing the main and side housings, bearing members therein, disposed at opposite sides of the main housing, and lapping the adjacent portions of the latter and the side housings to support the inner ends of the latter, a shaft mounted axially through each of the side housings, and projecting at its outer end through the respective side of the differential case, a gear secured upon the inner portion of each of said shafts adjacent to the inner side of its respective housing, a tubular shaft within the outer portion of each of the side housings around each of the first named shafts, and also projecting exteriorly through the respective side of the differential case, a gear secured upon each tubular shaft within its respective side housing, differential gears carried by each of the side housings and connecting the gears of the shafts thereof, and side connections at opposite ends of the differential case independently connected to the shafts of the two side housings.

6. A differential for a four wheel drive including a main differential housing having differential gears and openings at its opposite sides, a pair of side housings, the inner ends of which oppose opposite sides of the main housing and are provided with gears engaged by the differential gears of the main housing, a differential case inclosing the main and side housings, bearing members therein, disposed at opposite sides of the main housing, and lapping the adjacent portions of the latter and the side housings to support the inner ends of the latter, a shaft mounted axially through each of the side housings, and projecting at its outer end through the respective side of the differential case, a gear secured upon the inner portion of each of said shafts adjacent to the inner side of its respective housing, a tubular shaft within the outer portion of each of the side housings around each of the first named shafts, and also projecting exteriorly through the respective side of the differential case, a gear secured upon each tubular shaft within its respective side housing, differential gears carried by each of the side housings and connecting the gears of the shafts thereof, and side connections at opposite ends of the differential case independently connected to the shafts of the two side housings, each of said side differential housings being in two parts having abutting flanges, and connections between the flanges to normally secure the parts to one another.

7. A differential for a four wheel drive including a main differential housing having differential gears and openings at its opposite sides, a pair of side housings, the inner ends of which oppose opposite sides of the main housing and are provided with gears engaged by the differential gears of the main housing, a differential case inclosing the main and side housings, bearing members therein, disposed at opposite sides of the main housing, and lapping the adjacent portions of the latter and the side housings to support the inner ends of the latter, a shaft mounted axially through each of the side housings, and projecting at its outer end through the respective side of the differential case, a gear secured upon the inner portion of each of said shafts adjacent to the inner side of its respective housing, a tubular shaft within the outer portion of each of the side housings around each of the first named shafts, and also projecting exteriorly through the respective side of the differential case, a gear secured upon each tubular shaft within its respective side housing, differential gears carried by each of the side housings and connecting the gears of the shafts thereof, side connections at opposite ends of the differential case independently connected to the shafts of the two side housings, each of said shaft gears having a notched peripheral face, and spring pressed roller carrying pins mounted in the side housings, and having movement on the said peripheral faces of the shaft gears into and out of the notches thereof.

GEORGE W. WILKIN.